United States Patent Office 3,276,192
Patented Oct. 4, 1966

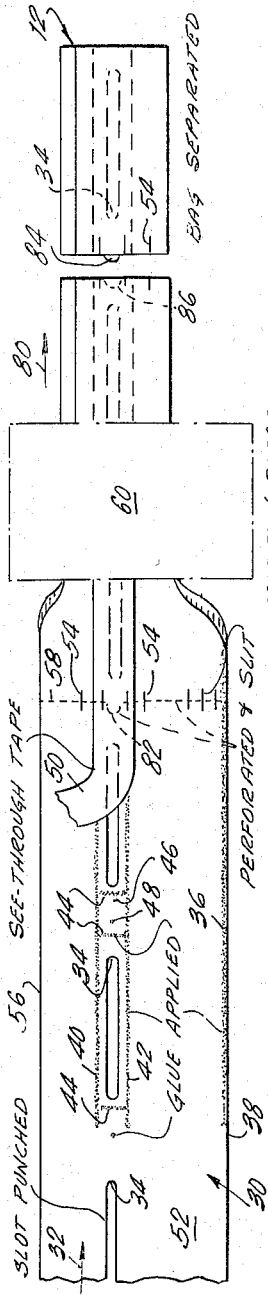

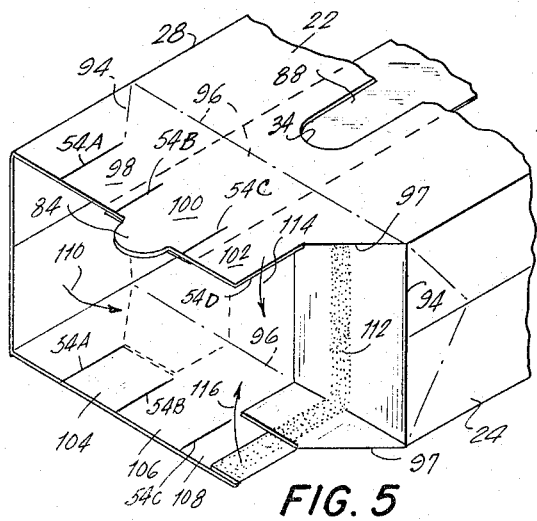
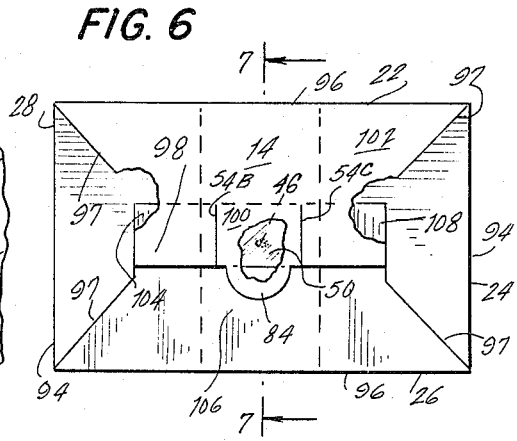
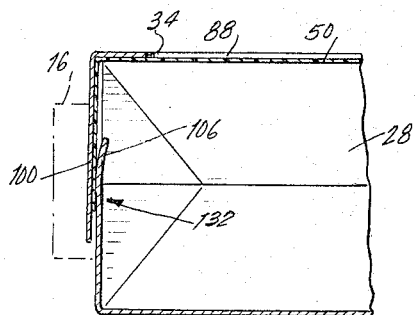
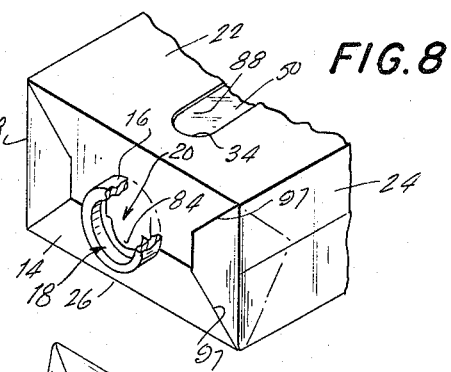
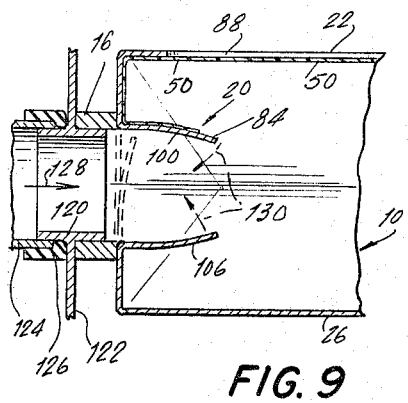
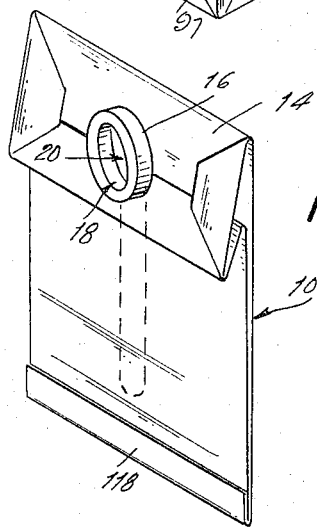

3,276,192
DISPOSABLE FILTER BAG
John J. Fesco, Baldwin, N.Y., assignor to Studley Paper Company, Inc., a corporation of New York
Filed June 11, 1963, Ser. No. 287,032
3 Claims. (Cl. 55—367)

The present invention relates in general to disposable-type filter bags for use with vacuum cleaning devices and more particularly to a self-acting closure or valve means for said type of disposable filter bag.

Disposable-type filter bags have almost universally replaced the relatively permanent-type filter receptacles which previously formed part of vacuum cleaning devices. Disposable filter bags have distinct advantages both with respect to hygienic considerations and convenience of utilization. In general a disposable-type filter bag for use with vacuum cleaners comprises an enclosure formed of relatively flexible air pervious filter paper or similar materials capable of separating the dust, debris and similar materials from the air stream in which it is entrained. In the type of filter bag to which the present invention is directed, an aperture is provided in one end wall of the filter bag for the entrance of the dust laden air therein. A mounting means in the form of a collar or ring encompasses the aperture provided in the end wall. Said collar is adapted to be coupled either to a coupling arrangement on the wall of the tank to which an air inlet conduit is coupled or the collar is adapted to be coupled directly to the end of the air inlet conduit so that the dust laden air can flow into the bag through the aperture in the end wall thereof.

The desirability of providing such an aperture with a self-acting closure or valve means has heretofore been recognized in the prior art. In a prior art filter bag, an end closure valve has been provided in a bag of the type wherein the bag is adapted to be mounted directly onto the end of the air inlet conduit so that the latter extends through the end wall opening directly into the bag. Consequently, the insertion of the conduit into the bag has been utilized to open a closure provided in the end wall of the bag and the withdrawal of the conduit therefrom has been utilized for the purpose of closing said closure or valve. However, it has not heretofore been possible to provide a self-acting closure or valve for such an end opening which is provided with a mounting collar for coupling items through the air inlet conduit or to a coupling means on the wall of the tank so that the conduit itself does not enter into the bag and consequently the conduit cannot be utilized for the purpose of opening or closing the valve.

Therefore, it is an object of the present invention to provide a filter bag of the described type having an end wall opening which is provided with a self-operating closure or valve which is not dependent for operation upon insertion and removal of an air inlet conduit from the bag.

It is another object of the present invention to provide a closure or valve means for the vent openings of a filter bag which is truly self-operating in its operation in view of the fact that it does not depend upon the insertion or removal of any part into the bag through the end wall opening.

It is a still further object of the present invention to provide a filter bag of the described type having an end wall opening which is provided with a self-acting closure or valve means which valve means is operable to the open position thereof in response to the flow of air through the opening into the bag and which is operable to the closed position thereof automatically upon the termination of air flow into the bag.

It is a still further object of the present invention to provide a valve means of the described type in the end wall of a filter bag of the described type which valve means opens in response to air flow into the bag and which is provided with a resilient hinge forming means which is biased to the open position thereof in response to said air flow so that it is operable to the closed position thereof upon termination of air flow into the bag.

Other and further objects of the present invention will be readily apparent to one skilled in the art from a consideration of the following specification taken in connection with the appended drawings.

In the drawings which illustrate the best mode presently contemplated for carrying out the invention, FIGURE 1 is a more or less schematic or diagrammatic illustration of the manner in which the bag blanks are formed which blanks are formed into filter bags pursuant to the present invention;

FIGURE 2 is a perspective view of a blank from which a bag pursuant to the present invention is formed;

FIGURE 3 is a sectional view on an enlarged scale taken on the line 3—3 of FIGURE 2;

FIGURE 4 is an end view of the blank taken in the direction of the arrows 4—4 of FIGURE 2, the bag being illustrated in partially open condition;

FIGURE 5 is a view similar to FIGURE 4 and illustrates the blank in an intermediate condition for forming the end wall thereof;

FIGURE 6 is an elevational view of the end wall or face of the blank with portions removed for purposes of illustration;

FIGURE 7 is a sectional view taken on the line 7—7 of FIGURE 6;

FIGURE 8 is a fragmentary perspective view of the bag showing the bag in inflated condition and looking at the apertured end wall of the blank;

FIGURE 9 is a fragmentary sectional view showing the bag secured to the tank of a vacuum cleaner and the valve means being shown in the open condition thereof in response to flow of air into the bag; and FIGURE 10 is a perspective view of a filter bag pursuant to the present invention, the bag being shown in collapsed or inoperative condition thereof.

In its general aspect, the invention comprises an enclosed bag or receptacle which is provided with an inlet closure valve which when opened defines an opening in the bag which opening is surrounded by a mounting ring or collar adapted to be engaged with the complementary inlet conduit of a vacuum cleaner. The dust, dirt and similar debris entrained in the air stream produced by the suction action of the vacuum cleaner is separated and collected within the filter bag which permits the passage of air through the wall thereof. When the dust capacity of the receptacle is reached, and this may be observed through a window provided in the filter bag, the latter is disengaged from the inlet conduit and may be disposed of without personal contact with the material contained therein.

The disposable filter receptacle comprising the present invention is more particularly illustrated in FIGURES 6–10. From said figures it may be seen that said disposable receptacle container is in the form of a conventional type paper bag designated generally by the reference numeral 10 and said bag being formed from a folded blank which is illustrated in FIGURE 2 and which is designated generally by the reference numeral 12. The bag is provided with a rectangular end face wall 14 and also includes a ring 16 which is provided on said end wall 14 and which ring encompasses an end opening 18 which is provided with the valve means 20 pursuant to the present invention. The bag also includes the side walls 22, 24, 26 and 28.

The blanks 12 are formed from a supply or roll 30 of suitable air filter or air pervious paper. The paper from the roll is moved in the direction of the arrow 32 through a closed conventional slot punching device which forms the elongated slots 34 therein. A suitable conventional mechanism not illustrated is utilized to apply glue or other suitable adhesive as illustrated at 36 along the marginal edge 38 of the roll of paper 30. The glue applying device also provides the longitudinally extending lines of glue 40 and 42 which straddles the slot 34 in a direction longitudinally thereof. The glue applying apparatus also applies the transverse lines of glue 44 which extends transversely between the longitudinal glue lines 40 and 42, there being two glue lines 44 between the adjacent ends of adjacent slots 34 as best illustrated in FIGURE 1. Consequently, it will be noted that the transverse glue lines 44 extending between the longitudinal glue lines 40 and 42 define a square 46 which is bounded by said glue lines so as to provide such a square between the adjacent ends of adjacent slots. Each square 46 is provided with a dab of glue as indicated at 48. A continuous transparent strip or tape 50 preferably formed of polyethylene or any suitable transparent plastic material is secured to the surface 52 of the paper 30 as it moves from the roll thereof, said securement being effected by pressing the tape from suitable mechanism not illustrated against the glue lines 40, 42 and 44 extending therebetween. It will be understood that the continuous tape 50 is advanced from a suitable roll or supply thereof not illustrated and is forced into adhesive contact with the surface 52 of the paper 30 issuing from the roll or supply thereof. Between the adjacent ends of the elongated slots 34 the length of paper 30 is perforated along the transverse line of perforations 58 thereof which extends from the longitudinal edge 38 to the opposite longitudinal edge 56 of the paper length 30. Provision is also made to provide eight longitudinally extending slits 54A, B, C and D which intersect each perforation line 58. The combination of paper 30 and the overlying continuous length of transparent tape 50 pass through a conventional folding and pleating apparatus 60. The device 60 folds the paper upon itself so as to secure the edges 38 and 56 together along the glue lines 36 as indicated at 62 in FIGURE 2. In addition, there is formed the longitudinally extending fold lines 64 and 66. The fold line 64 is defined or formed between the associated fold lines 68 and 70 and the fold line 66 is formed between the associated fold lines 72 and 74. The fold lines 64, 68 and 70 define a gusset 76 and the fold lines 66, 70 and 72 define a gusset 78. As the folded over paper length 30 issues from the folding and pleating device 60 in the direction of the arrow 80, the foremost portion thereof is separated from the following portion, by conventional methods, along the line of perforation 54 so that each foremost portion, when separated from the remainder of the folding paper roll 30, constitutes a paper bag blank 12 of the type best shown in FIGURE 2. Consequently, it will be apparent from FIGURE 2 that each blank 12 comprises a side wall 22 and an opposing side wall 26, said side walls being spaced by the opposing side walls 24 and 28, the side wall 24 being provided with the gusset 76 and the side wall 28 being provided with the gusset 78. It will be noted that the previously described transverse line of perforation 58 contains an arcuate perforation 82. Upon separation of the blank 12 from the paper length 30, the arcuate perforation 82 defines at one end of the wall 22 an arcuate tab 84 and at the other end of said wall an arcuate recess 86. It will be noted that each blank 12 is provided with a length of transparent tape 50 which extends along the inner surface of the wall 22 and extends from the tab 84 to the recess 86 and underlies the slot 34 defined in the wall 22 so as to form a transparent window 88 in said wall. As best seen in FIGURES 3 and 4, the tab 84 extends beyond the adjacent marginal edge 90 of the transparent tape 50. The previously mentioned drop 46 of glue provided on the paper roll 30 secures thereto the strip 50 adjacent its marginal edge 90, as best seen in FIGURE 6.

The face or end wall 14 is similar to the face wall disclosed in U.S. Patent No. 2,945,558 issued July 19, 1960 to M. Cordell. As here shown, end wall 14 is of generally rectangular conformation and is formed by the fold lines 94 defined in the opposing walls 24 and 28 and the fold lines 96 defined in the opposing walls 22 and 26. The previously mentioned slits 54A, B, C and D define bendable fingers 98, 100, and 102 in side wall 22 at the end thereof which defines face wall 14 and said slits define bendable fingers 104, 106 and 108 in the opposing side wall 26 at the same end thereof. In forming the face wall 14, the opposing walls 24 and 28 are bent inwardly, as indicated by arrow 110 in FIGURE 5, along the fold lines 94 to form oblique fold lines 97 which extend from the adjacent bendable fingers. A glue line 112 is provided on the outer surface of each inwardly bent portion of side wall 24 and 28 outwardly of fold line 94 therein. The end walls 22 and 26 are then bent inwardly along fold lines 96 therein, as indicated by arrows 114 and 116 so as to adhesively seal the outer fingers 98, 102, 104 and 108 to the underlying portions of the previously bent-in portions of walls 24 and 28, to provide the face wall 14, as best shown in FIGURE 6.

It will be noted that the central fingers 100 and 106 are free of securement and assume the disposition thereof best shown in FIGURE 7. As shown, finger 100 provided with tab 84 overlies finger 106 to constitute flexible flaps which define a valve 132 within the face wall 14. Further, it will be noted that the flexible tape 50 underlies and is secured, at 46, to the finger 100, terminating inwardly of tab 84 thereof. The tape 50, due to the inherent resiliency and flexibility thereof, forms the finger or valve element 100 into a bendable hinge as hereinafter described in greater detail. The previously mentioned collar 16 is secured to the face wall 14, about the valve 132, in the manner illustrated and described in said Cordell patent. The other end of the bag is folded upon itself to form the end closure 118.

FIGURE 9 illustrates the manner in which the bag 10 is mounted in a vacuum cleaner. As here shown, a fitting 120 is provided in the wall 122 of the vacuum cleaner tank. The collar 16 is engaged on one end of the fitting and the other end is secured to the air conduit of the vacuum cleaner by means of the resilient fitting 126.

During operation of the vacuum cleaner, the suction motor thereof will cause the dust laden air to flow through the conduit 124 in the direction of arrow 128 toward the filter bag 10. The suction pressure within the bag will cause the flexible flaps of the valve 132 to flex or bend into the interior of the bag from the broken line to the full line position thereof, as shown in FIGURE 9. This creates an opening in face or end wall 14 through which the dust laden air flows into and through the bag 10, the dust and debris in the air stream being deposited in the bag. Upon discontinuance of the suction pressure within the bag, the flexible fingers or flaps tend to return to their full line or closed position, as shown in FIGURE 7. This tendency to return to their normal closed position is facilitated by the inherent resiliency of tape 50 secured to the inner surface of valve finger 100. The closed valve serves to prevent the inadvertent discharge of dust and debris from the bag 10 when the vacuum cleaner is inoperative.

While I have illustrated and described the presently preferred embodiment of my invention, it will be understood that various changes and modifications can be made therein without however departing from the inventive concept thereof, as set forth in the appended claims.

I claim:
1. A dust receptacle for a vacuum cleaning device comprising a bag-like enclosure formed of a filtering material, said enclosure being defined by opposing side walls and at least one end face wall, an inlet air flow aperture defined in said end wall, suction responsive valve means provided in said end wall for normally closing said aperture in the absence of suction pressure within said enclosure and for opening said aperture in response to said suction pressure, said valve means comprising a pair of oppositely extending overlapping flexible fingers integrally formed in said end wall and flexible into said enclosure in response to suction pressure therein, an elongated slot defined in one of said side walls, and a transparent flexible plastic strip secured to the inner surface of said one side wall, said strip underlying said slot to define a window in said one side wall, one end of said strip extending from said one side wall to said end face wall and being secured to the inner surface of one of said flexible fingers to form hinge means for urging said one finger to closed position and bias the latter in response to said flexing thereof.

2. A dust receptacle for a vacuum cleaning device comprising a bag-like enclosure formed of a filtering material, said enclosure being defined by opposing side walls and at least one end face wall, an inlet air flow aperture defined in said end wall, suction responsive valve means provided in said end wall for normally closing said aperture in the absence of suction pressure within said enclosure and for opening said aperture in response to said suction pressure, said valve means comprising a pair of oppositely extending overlapping flexible fingers defined in said end wall and flexible into said enclosure in response to suction pressure therein, an elongated slot defined in one of said side walls, and a transparent flexible plastic strip secured to the inner surface of said one side wall, said strip underlying said slot to define a window in said one side wall, one end of said strip extending from said one side wall to said end face wall and being secured to the inner surface of the outer one of said flexible fingers to form hinge means for urging said one finger to closed position and bias the latter in response to said flexing thereof.

3. A dust receptacle for a vacuum cleaning device comprising a bag-like enclosure formed of a filtering material, said enclosure being defined by opposing side walls and at least one end face wall, an inlet air flow aperture defined in said end wall, suction responsive valve means provided in said end wall for normally closing said aperture in the absence of suction pressure within said enclosure and for opening said aperture in response to said suction pressure, said valve means comprising a pair of oppositely extending overlapping flexible fingers defined in said end wall and flexible into said enclosure in response to suction pressure therein, an elongated slot defined in one of said side walls, and a transparent flexible plastic tape strip secured to the inner surface of said one side wall, said strip underlying said slot to define a window in said one side wall, one end of said strip extending from said one side wall to said end face wall and being secured to the inner surface of the outer one of said flexible fingers to form hinge means for urging said one finger to closed position and to bias the latter in response to said flexing thereof, the outer one of said fingers having a free end tab, said one side wall having a free marginal edge in which there is defined an open recess which is aligned with said slot, one end of said strip underlying said open recess and the other end of said strip terminating at said tab.

References Cited by the Examiner
UNITED STATES PATENTS

| | | | |
|---|---|---|---|
| 1,163,716 | 12/1915 | Van Der Putten | 55—367 XR |
| 1,923,299 | 8/1933 | Darling | 55—368 X |
| 1,970,848 | 8/1934 | Grant | 229—53 |
| 2,070,674 | 2/1937 | Muentener | 55—367 |
| 2,174,730 | 10/1939 | White | 55—368 XR |
| 2,336,584 | 12/1943 | Andrew | 229—62.5 |
| 2,390,196 | 12/1945 | Taylor | 55—368 |
| 2,626,418 | 1/1953 | Kelley et al. | 55—420 XR |
| 2,729,303 | 1/1956 | McMahan | 55—367 XR |
| 2,737,263 | 3/1956 | Anderson | 55—367 |
| 2,792,076 | 5/1957 | Meyerhoefer | 55—381 |
| 2,804,166 | 8/1957 | Stevens et al. | 55—382 X |
| 2,848,062 | 8/1958 | Meyerhoefer | 55—368 XR |
| 2,945,558 | 7/1960 | Cordell | 55—376 |
| 2,995,205 | 8/1961 | Cordell | 55—381 |
| 2,998,864 | 9/1961 | Gaudry | 55—373 |
| 3,113,853 | 10/1963 | Verhagen | 55—420 XR |
| 3,200,571 | 8/1965 | Shufflebotham | 55—367 |

HARRY B. THORNTON, *Primary Examiner.*
D. TALBERT, L. H. McCARTER, *Assistant Examiners.*